United States Patent

Hartweg et al.

[11] Patent Number: 6,030,589
[45] Date of Patent: *Feb. 29, 2000

[54] CATALYST, METHOD FOR ITS PRODUCTION AND USE OF SAME

[75] Inventors: Martin Hartweg, Erbach; Andrea Seibold, Blaustein; Leonhard Walz, Rastatt; Thomas Fetzer, Speyer; Bernd Morsbach, Ludwigshafen, all of Germany

[73] Assignee: Daimlerchrysler AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/763,535

[22] Filed: Dec. 12, 1996

[30] Foreign Application Priority Data

Dec. 13, 1995 [DE] Germany .......................... 195 46 476

[51] Int. Cl.⁷ .................................................. B01D 53/54
[52] U.S. Cl. ...................................... 423/213.2; 423/213.5; 423/239.1
[58] Field of Search ............................. 423/213.2, 213.5, 423/239.1

[56] References Cited

U.S. PATENT DOCUMENTS

| | | | |
|---|---|---|---|
| 4,228,138 | 10/1980 | Sermon | 423/239.1 |
| 4,261,862 | 4/1981 | Kinoshita et al. | 423/213.5 |
| 4,692,318 | 9/1987 | Tolpin et al. | 423/239.1 |
| 5,227,145 | 7/1993 | Kintaichi et al. | 423/239.1 |
| 5,387,408 | 2/1995 | Schneider et al. | 423/656 |

FOREIGN PATENT DOCUMENTS

| | | |
|---|---|---|
| 0 042 471 | 12/1981 | European Pat. Off. . |
| 94 04158 | 4/1994 | France . |
| 41 42 900 | 6/1993 | Germany . |
| 42 24 881 | 2/1994 | Germany . |
| 4224881 | 2/1994 | Germany . |
| 43 01 470 | 7/1994 | Germany . |
| B2 61-37983 | 8/1986 | Japan . |
| 7-251074 | 10/1995 | Japan . |
| 7-284662 | 10/1995 | Japan . |

*Primary Examiner*—Thomas Dunn
*Assistant Examiner*—Peter DiMauro
*Attorney, Agent, or Firm*—Evenson, McKeown, Edwards & Lenahan, P.L.L.C.

[57] ABSTRACT

A method of catalytically reducing nitrogen oxides ($NO_x$) and oxidizing hydrocarbons or carbon monoxide in exhaust gases of internal combustion engines or combustion power plants using a catalyst comprising a magnesium oxide/copper oxide/aluminum oxide spinel or a copper-impregnated copper oxide/aluminum oxide spinel.

11 Claims, 2 Drawing Sheets

CATALYST, METHOD FOR ITS PRODUCTION AND USE OF SAME

BACKGROUND AND SUMMARY OF THE INVENTION

The present invention relates to the use of a catalyst comprising a magnesium oxide/copper oxide/aluminum oxide spinel or a copper-impregnated copper oxide/aluminum oxide spinel for catalytic reduction of nitrogen oxides ($NO_x$) in exhaust gases of internal combustion engines and/or combustion power plants.

Published German Patent Application No. DE 43 01 470 discloses a $CuAl_2O_4$ spinel to which tin, lead and an oxide, a salt or an elemental form of an element of the second main or subsidiary group of the Periodic Table has been added, and subsequently calcined to form the final spinel. The spinel is used to decompose $N_2O$. However, this patent does not disclose the use of this catalyst for catalytic oxidation of CO and/or the catalytic reduction of $NO_x$, particularly at temperatures of several hundred degrees Centigrade.

A spinel is a composition of the general chemical formula $A_aB_bO_4$, which has, at least microscopically, a crystallographic or crystalline cubic lattice structure with face-centered oxygen ions and with tetrahedral or octahedral gaps. The A elements and up to 50% of the B elements are disposed in the tetrahedral gaps and the remaining B elements are disposed in the octahedral gaps. The term A element or B element refers here to the crystallographic arrangement. From a material point of view, the A and B elements can be different from one another.

For environmental reasons, the purification of gases, particularly of exhaust gases which are produced by internal combustion engines, for example, especially, by diesel engines and engines operating on a lean mixture, as well as the decrease in the CO content of exhaust gases and the denitrification of these gases, that is, the decomposition of nitrogen oxides ($NO_x$), is a pressing problem.

Published European Patent Application No. EP 042 471 discloses a catalyst which is used for the catalytic oxidation of carbon monoxide (CO) to carbon dioxide ($CO_2$) and contains the metals copper (Cu), zinc (Zn) and aluminum (Al) as metal oxides. At least 60% of the Cu present is bound to the aluminum oxide as a copper oxide/aluminum oxide spinel. In the free spaces of the porous spinel, zinc oxide is disposed in an amount of 1% to 20% by weight.

The catalyst of EP 042 471 has a purifying action only with respect to the CO, which is based on the catalytic oxidation of carbon monoxide. However, EP 042 471 does not disclose whether the catalyst is suitable for the purification of $NO_x$ and/or hydrocarbons produced by internal combustion engines or combustion power plants.

It is an object of the present invention to develop a catalyst that has good stability in the presence of exhaust or waste gas components and good purification action, particularly with respect to $NO_x$.

Pursuant to the present invention, these and other objects are accomplished by a catalyst comprising a magnesium oxide/copper oxide/aluminum oxide spinel having the chemical formula:

$$Mg_ACu_BAl_CO_4$$

wherein $A+B+C \leq 3$ and $A>0$, $B>0$ and $C>0$.

Furthermore, these and other objects are also accomplished by a catalyst comprising a copper-impregnated copper oxide/aluminum oxide spinel having the chemical formula:

$$Cu_ACu_BAl_2O_4$$

wherein $A+B=1$ and $A>0$, and $B>0$.

By using a $Mg_ACu_BAl_CO_4$ or a $Cu_ACu_BAl_CO_4$ spinel, produced by a method disclosed in Published German Patent Application No. DE 43 01 470, the catalyst is largely stable with respect to exhaust gas components such as $H_2O$, $NO_x$, $CO_2$ and/or $SO_2$ and acts in an oxidizing manner on hydrocarbons and carbon monoxide and in a catalytically reducing manner on $NO_x$, particularly on NO and $NO_2$. The reduction of $NO_x$ takes place in an oxygen-containing gas in the presence of reducing agents such as hydrocarbons. Advantageously, the hydrocarbons are present in sufficient concentration in the exhaust gas of internal combustion engines, particularly of diesel engines. Moreover, it has proven to be advantageous to provide these spinels with catalytically active elements such as palladium, platinum, rhodium, ruthenium, osmium, iridium, rhenium and/or rare earth metals such as lanthanum and cerium, vanadium, titanium, niobium, molybdenum, tungsten and/or salts thereof and/or oxides thereof.

According to the present invention, substoichiometric compounds in which $Al_2O_3$ functions as a matrix and which have characteristic spinel lines in the X-ray spectrum, are also regarded as spinels. The spinel of the composition $AAl_2O_4$ is present in the $Al_2O_3$ matrix, so that a stoichiometry of $A_{(1-x)}Al_2O_4$ results.

In a preferred embodiment, the catalyst comprises a copper oxide/magnesium oxide/aluminum oxide spinel of the chemical formula $$Mg_{(1-B)}Cu_BAl_2O_4$$

wherein $0<B<1$.

Other objects, advantages and novel features of the present invention will become apparent from the following detailed description of the invention when considered in conjunction with the accompanying drawings.

DETAILED DESCRIPTION OF PREFERRED EMBODIMENTS

EXAMPLE 1

A magnesium/copper/aluminum spinel having the composition $Mg_{0.5}Cu_{0.5}Al_2O_4$ was used as the spinel. The spinel was advantageously prepared by a method similar to that disclosed in Published German Patent Application No. DE 43 01 470. A 6.5 gram sample of the spinel was transferred to a vertically oriented quartz reactor having a diameter of 20 mm and a height of approximately 500 mm, in which a gas-permeable sintered glass disk was disposed in the middle to expose the sample. The height of the bed was about 15 mm. A furnace was arranged around the quartz reactor which heated the middle part of the reactor over a length of about 100 mm at temperatures of up to 550° C.

A gas mixture, which consisted of 1,000 ppm NO, 1,000 ppm propene and 10% oxygen, the remainder being argon as a carrier gas, was passed through the catalyst. After the reactor, the NO concentration was measured with a gas detector, in which any $NO_2$ formed was reduced in a converter to nitric oxide (NO) before the measurement. Simultaneously, oxidation of hydrocarbons to carbon dioxide was observed by measuring the carbon dioxide content with the gas detector. The catalyst exhibited a high stability.

Advantageously, the temperature intervals coincide with the temperatures which can occur in the exhaust gas system of an internal combustion engine, particularly of a diesel engine.

Figure 1:
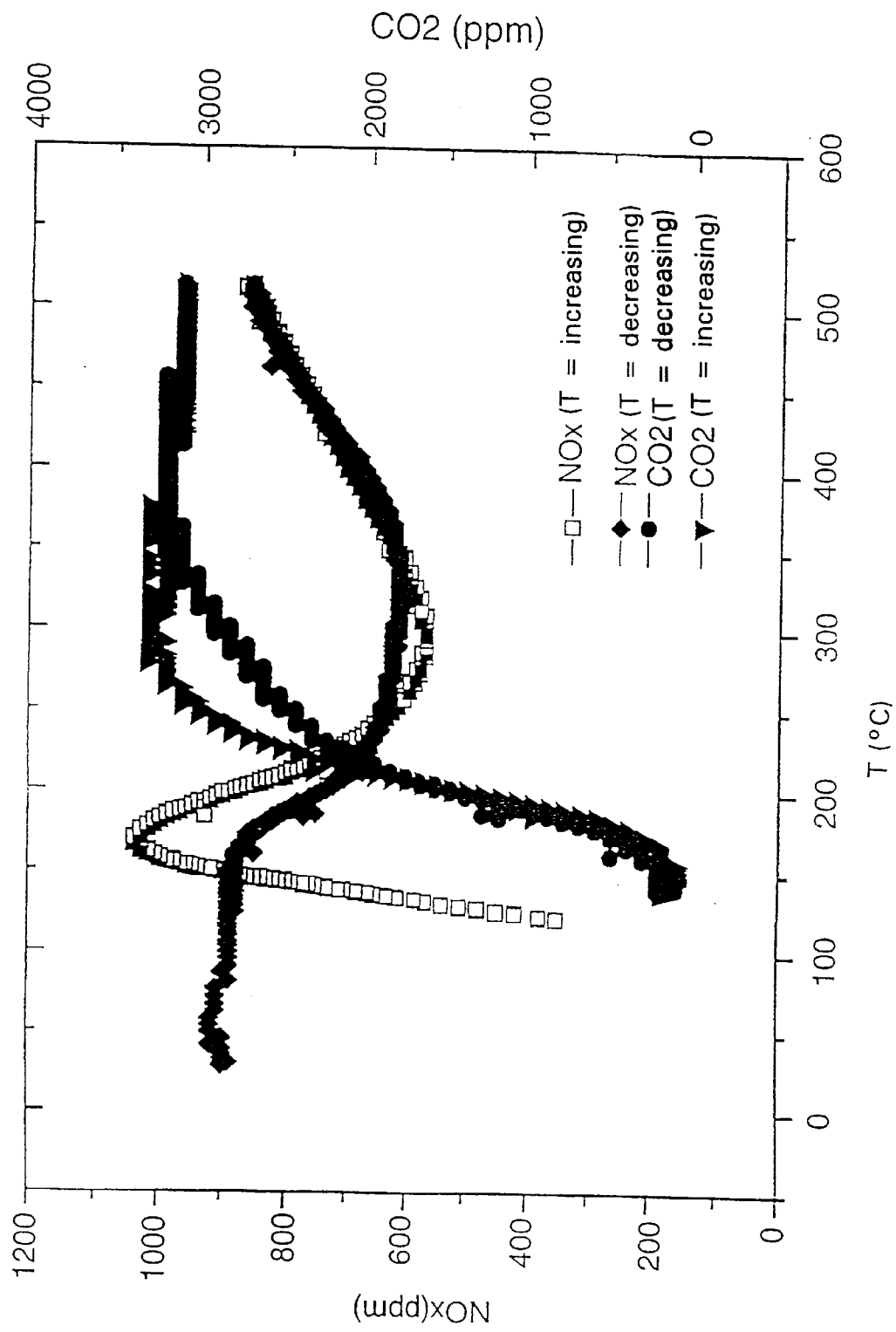
FIG. 1 is a graph of the $NO_x$(NO) reduction and CO oxidation as a function of the temperature for a $Mg_{0.5}Cu_{0.5}Al_2O_4$ spinel.

The $NO_x$(NO) and $CO_2$ concentrations in ppm are shown as a function of the temperature in FIG. 1. As the temperature increases, the NO concentration decreases sharply and reaches a minimum at about 320° C.

Further testing of this catalyst revealed a high resistance to $NO_x$, $H_2O$, and $CO_2$.

EXAMPLE 2

A copper/aluminum spinel impregnated with copper having the composition $Cu_{0.5}Cu_{0.5}Al_2O_4$ was used as spinel. The spinel was prepared by a method disclosed in Published German Patent Application No. DE 43 01 470. A 6.5 gram sample of the spinel was transferred to a vertically oriented quartz reactor having a diameter of 20 mm and a height of approximately 500 mm, in which a gas-permeable sintered glass disk was disposed in the middle for exposing the sample. The height of the bed was about 15 mm. A furnace was arranged around the quartz reactor and heated the middle part of the reactor over a length of about 100 mm at temperatures of up to 550° C.

A gas mixture which consisted of 1,000 ppm NO, 1,000 ppm propene and 10% oxygen, the remainder being argon as a carrier gas, was passed through the catalyst. After the reactor, the NO concentration was measured with a gas detector, in which any $NO_2$ formed was reduced in a converter to nitric oxide (NO) before the measurement. Simultaneously, oxidation of hydrocarbons to carbon dioxide was observed by measuring the carbon dioxide content with the gas detector. The catalyst showed high stability.

Here also, the temperature interval given coincided with the temperatures which can occur in the exhaust gas line of an internal combustion engine, particularly a diesel engine. Measurements were carried out with the temperature increasing as well as decreasing, and a hysteresis was observed.

Figure 2:
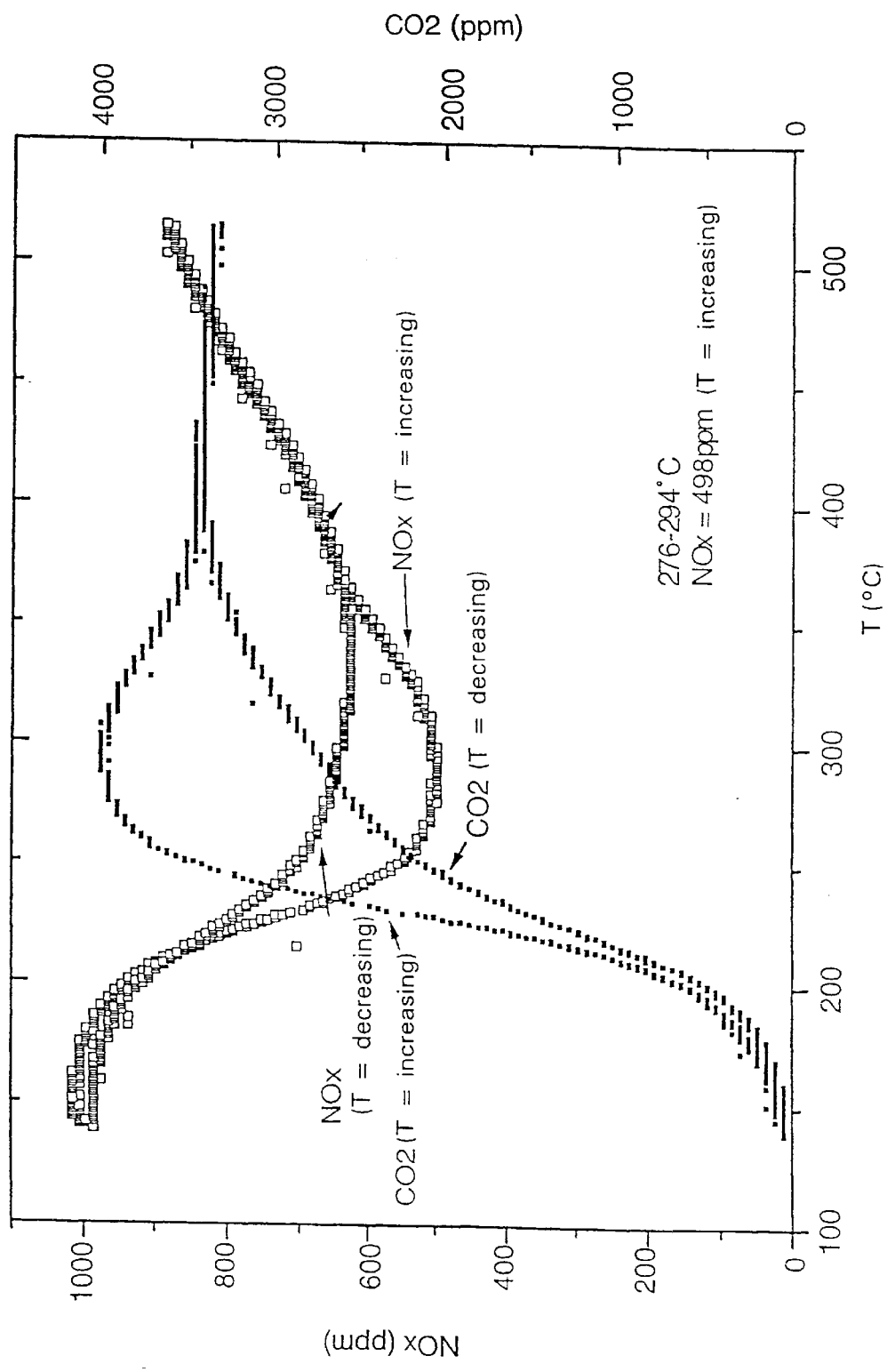
FIG. 2 is a graph of the $NO_x$(NO) reduction and CO oxidation as a function of the temperature for a $Cu_{0.5}Cu_{0.5}Al_2O_4$ spinel.

The $NO_x$(NO) and $CO_2$ concentrations in ppm are shown as a function of the temperature in FIG. 2. As the temperature increases, the NO concentration decreases sharply and reaches a minimum at about 280° C.

Further testing of this catalyst revealed a high resistance to $NO_x$, $H_2O$, and $CO_2$.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of catalytically reducing nitrogen oxides ($NO_x$) in the presence of oxygen in exhaust gases of internal combustion engines or combustion power plants, comprising contacting the exhaust gas with a catalyst comprising a magnesium oxide/copper oxide/aluminum oxide spinel having the chemical formula:

$$Mg_ACu_BAl_CO_4$$

wherein $A+B+C \leq 3$ and $A>0$, $B>0$ and $C>0$, in the presence of hydrocarbons as a reducing agent at a temperature up to 320° C.

2. The method of claim 1, wherein the catalyst comprises a copper oxide/magnesium oxide/aluminum oxide spinel of the chemical formula $$Mg_{(1-B)}Cu_BAl_2O_4$$

wherein $0<B<1$.

3. The method of claim 1, wherein the catalyst comprises a copper oxide/magnesium oxide/aluminum oxide spinel of the chemical formula $$Mg_{0.5}Cu_{0.5}Al_2O_4.$$

4. The method of claim 1, wherein the catalyst is porous.

5. The method of claim 1, wherein the catalyst additionally comprises at least one element selected from the group consisting of palladium, platinum, rhodium, ruthenium, osmium, iridium, rhenium, lanthanum, cerium, vanadium, titanium, niobium, molybdenum, tungsten, salts thereof, and oxides thereof.

6. The method of claim 1, comprising placing the catalyst in an exhaust line of a diesel engine.

7. A method of catalytically reducing nitrogen oxides ($NO_x$) in the presence of oxygen in exhaust gases of internal combustion engines or combustion power plants, comprising contacting the exhaust gas with a catalyst comprising a copper-impregnated copper oxide/aluminum oxide spinel as in the chemical formula:

$$Cu_ACu_BAl_2O_4$$

wherein $A+B=1$ and $A>0$, and $B>0$, in the presence of hydrocarbons as a reducing agent at a temperature up to 320° C.

8. The method of claim 7, wherein the catalyst comprises a copper-impregnated copper oxide/aluminum oxide spinel of the chemical formula $$Cu_{0.5}Cu_{0.5}Al_2O_4.$$

9. The method of claim 7, wherein the catalyst is porous.

10. The method of claim 7, wherein the catalyst additionally comprises at least one element selected from the group consisting of palladium, platinum, rhodium, ruthenium, osmium, iridium, rhenium, lanthanum, cerium, vanadium, titanium, niobium, molybdenum, tungsten, salts thereof, and oxides thereof.

11. The method of claim 7, comprising placing the catalyst in an exhaust line of a diesel engine.

* * * * *